Figure 1:
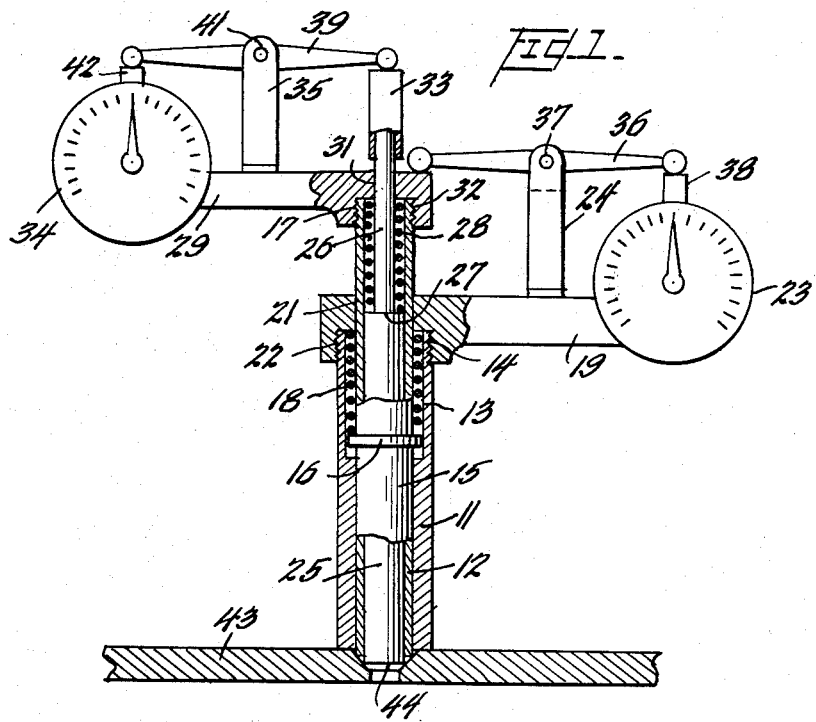

Jan. 7, 1964   G. T. MATTHEWS   3,116,560
GAGE FOR DETERMINING SIZE AND ANGLE OF COUNTERSINK
Filed July 11, 1961

INVENTOR
George T. Matthews,
BY R. P. Miller
ATTORNEY

United States Patent Office 3,116,560
Patented Jan. 7, 1964

3,116,560
GAGE FOR DETERMINING SIZE AND ANGLE OF COUNTERSINK
George T. Matthews, Burlington, N.C., assignor to Western Electric Company, Incorporated, New York, N.Y., a corporation of New York
Filed July 11, 1961, Ser. No. 125,923
4 Claims. (Cl. 33—174)

This invention relates to a gaging device and more particularly to a gaging device for determining the size and angle of a countersunk bore.

In the manufacture of certain workpieces such as plates containing countersunk bores, it is often desired to gage the bore in order to determine the angle and the diameter of the countersink. In the past this has constituted a dual operation in that the angle and the diameter of the countersink are checked individually, thereby rendering an inefficient and time-consuming operation. Additionally, inefficiency has resulted in the apparatus utilized for transmitting the gaged measurements from the bore to an indicator.

One object of the invention is to provide a new and simple gaging device.

An additional object resides in a gage by which the angle and diameter of a countersink may be measured in a single operation.

Another object of this invention is to provide a pair of relatively sliding members for engaging a countersunk aperture to actuate a pair of indicating dials.

A further object of this invention is to provide a gaging device which will accurately transmit the sought measurements from a sensing means to a visual indicator.

A still further object of this invention is to provide a pair of relatively sliding coaxial members for engaging a countersunk aperture to first actuate an angle-measuring dial and, second, upon the registering of a desired angle, to actuate a diameter-measuring dial to indicate the exact diameter of the countersunk aperture.

With these and other objects in mind, the present invention contemplates a gaging device which is positioned coaxially above a countersink in a workpiece. A pair of coaxial, relatively sliding sensing means are positioned within the countersink by a pair of bias springs. Upon movement of the sensing means, a pair of levers are pivoted to actuate a pair of dials. Due to trigonometric and geometric relations existing between the pair of sensing means engaging the surface of the countersink, the angle and diameter of the countersink are measured and visually indicated on a pair of dials.

However, the countersink tool may not form the desired angle within the aperture, thus necessitating the need for a gage for determining the angle as well as the diameter of the countersink. Therefore, as the gage is positioned about the countersunk aperture as previously described, an angle-measuring dial is actuated to record the actual angle of the countersunk aperture. If the reading of the angle-measuring dial coincides with the known angle of the countersink tool, then the diameter of the countersunk aperture is recorded on a diameter measuring dial. In the event the angle which is measured differs from that of the known angle of the countersink tool, the diameter reading will not be correct. Thus it is easily seen that in order to facilitate the correct diameter reading, the angle measured by the angle-measuring dial must coincide with a desired angle or the known angle of the countersink tool.

Figure 2:
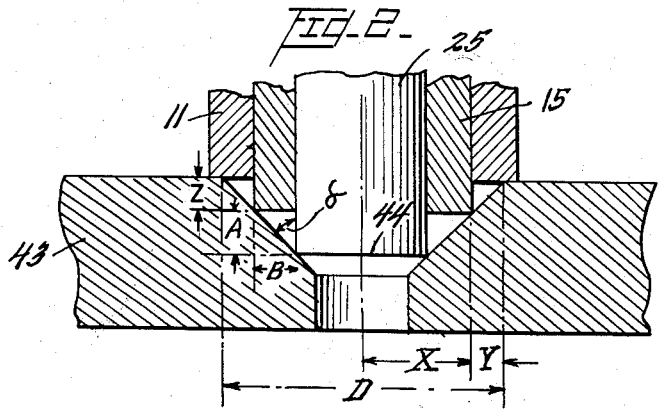

Other objects and advantages of the invention will become apparent by reference to the following detailed descriptions and the accompanying drawings illustrating a preferred embodiment thereof, in which:

FIG. 1 is a fragmentary, side elevational view of a gaging device in position to sense and ascertain the angle and diameter of a countersunk hole in accordance with the principles of the invention; and FIG. 2 is an enlarged view of a countersunk hole of FIG. 1 showing the trigonometric and geometric relations existing between the pair of sensing elements and the wall of the countersunk hole.

Referring now in detail to the drawings, FIG. 1 shows a cylindrical housing 11 having an axial bore 12 with a counterbored portion 13 and a threaded outer portion 14 at one end thereof. Positioned within the bore 12 of the housing 11 is a sleeve 15 having an annular rib 16 positioned intermediate the ends thereof. The sleeve 15 is externally threaded at one end 17. The annular rib 16 is positioned within the counterbored portion 13 of the housing 11. A biasing spring 18 is coaxially positioned about the sleeve 15 to rest upon and urge the annular rib 16 toward the shoulder formed at the junction of bores 12 and 13. A support bar 19, having a bore 21 with an enlarged threaded portion 22, is coaxially positioned about the sleeve 15 and threadedly fastened to the housing 11. A commercially available dial indicator 23, calibrated in inches, is mounted at the opposite extremity of the support bar 19 with a fulcrum 24 being positioned intermediate the ends of the support bar.

A sensing rod 25 having a reduced shank 26 and a shoulder 27 is positioned within the sleeve 15 where a biasing spring 28 is coaxially positioned about the reduced shank 26 and rests on the shoulder 27 of the rod 25. A suport bar 29 having an axial bore 31 with an enlarged threaded portion 32 is coaxially positioned about the reduced portion 26 of the rod 25 and threadedly fastened to the sleeve 15. A cap 33 is placed over the exposed end of the reduced shank 26 of the rod 25. A commercially available dial indicator 34, calibrated to read angles, is positioned at the opposite extremity of support bar 29 with a fulcrum 35 placed intermediate the ends of the support bar.

A lever 36 is pivotally mounted at 37 on the fulcrum 24 having one end resting on an actuator 38 of the dial indicator 23 and the opposite end resting on the upper surface of the support bar 29. A lever 39 is pivotally mounted at 41 on the fulcrum 35 having one end resting on an actuator 42 of the dial indicator 34, and the opposite end resting on the cap 33.

As the gaging device is positioned on the plate 43 about the countersink 44, as shown in FIG. 1, the biasing action of the springs 18 and 28 urge the sleeve 15 and the sensing rod 25 into the countersink 44. Due to the movement of the rod 25 and the sleeve 15, levers 39 and 36 are pivoted to actuate the dials 34 and 23, respectively, thereby measuring the angle and the diameter of the countersink respectively.

As shown in FIG. 2, the gaging apparatus is positioned about the countersink 44 of the plate 43 such that the sleeve 15 and the sensing rod 25 are positioned to determine the desired measurements. The sensing rod 25 forms an angle $\alpha$ with the surface of the countersink 44. This angle $\alpha$ is the measured angle appearing on dial 34 and is determined by utilization of a trigonometric function where the tangent $\alpha$ is equal to side B divided by side A. In this instance, side B is a known quantity, being the thickness of sleeve 15. Therefore, side A will be a variable dependent upon the depth of penetration by rod 25 into the countersink 44. Hence $\alpha$ will be equal to $\tan^{-1} \alpha B/A$. This trigonometric relation is transferred through the sensing rod 25 and the sleeve 15 to the dial 34 thereby indicating the angle of countersink.

Further, the diameter is measured in a similar manner as the angle. The distance from the axis of the sensing rod 25 to the outer surface of the sleeve 15 is a known value represented by X in FIG. 2. Therefore, the only unknown value existing between the axis of the sensing rod 25 and the outer edge of the countersink 44 is the value represented by Y. In order to determine the value Y, a trigonometric relation again is utilized. If the angle, as determined previously, is of the desired value, the distance that the sleeve 15 penetrates the countersink 44 is a known variable represented by Z. The angle which sleeve 15 forms with the surface of countersink 44 is equal to the previously determined angle $\alpha$. With this relationship existing, the tangent function can again be utilized to determine the value of Y by multiplying the tangent of $\alpha$ by the known variable Z. By doubling the sum of the values of X and Y, the diameter of the countersink 44 is measured. This value is transferred through the mechanical action of the sleeve 15 to the dial 23 to indicate the diameter of the countersink 44. It is to be noted that the position of the angle dial support 29 determines the movement of lever 36 which actuates the diameter measuring dial 23. Hence, cooperation between the angle-measuring and diameter-measuring elements is necessary for complete operation of the gaging apparatus.

Since the operation of the gaging apparatus facilitates the measuring of the diameter of the countersunk aperture 44, it is to be noted that the reading of the angle-measuring dial 23 must coincide with the desired angle before the diameter-measuring dial 23 indicates a proper reading. This important feature facilitates the measuring operation by providing the operator with means for determining, upon the measuring of the angle, whether or not the countersink 44 is of the desired value, thereby allowing the operator to discard plate 43 without observing the diameter-measuring dial 23.

It is to be understood that the above-described arrangements are simply illustrative of the principles of the application. Numerous other arrangements may be devised by those skilled in the art which will embody the principles of the invention and will fall within the spirit and scope thereof.

What is claimed is:

1. In a gaging device for ascertaining the diameter of an angular countersink formed in an article, a housing, a first sensing rod of predetermined diameter positioned within the housing, spring means for urging the first rod into engagement with the side wall of the countersink, a second hollow sensing rod of predetermined thickness mounted coaxially of the first rod, spring means for urging the second rod into engagement with the side wall of the countersink, a support mounted on said second rod of predetermined thickness, a dial indicator calibrated to read angles mounted on said support, a lever pivotally mounted on said support and engaging said first rod of predetermined diameter for actuating said dial indicator, a second dial indicator calibrated to read the diameter of said countersink mounted on said housing, and a lever engaging said support for imparting movements of the support to actuate the second dial indicator.

2. In a gaging device, a housing having a bore, said bore having an enlarged section at one end thereof, a sleeve of predetermined thickness positioned for sliding movement within said housing, said sleeve having an annular rib concentrically positioned in said enlarged section of said bore, a rod of predetermined diameter positioned for sliding movement within said sleeve, said rod having a reduced portion at one end and a shoulder intermediate the ends of said rod, a first dial calibrated to read angles mounted on said sleeve, means connecting said first dial to the reduced portion of said rod for actuating said dial upon relative movement of said rod and said sleeve, a second dial calibrated to read diameter mounted on said housing, means connecting said second dial to said sleeve for actuating said dial upon relative movement of said rod and said sleeve, a first biasing means coaxially positioned about said sleeve and resting on said annular rib for urging said sleeve to project beyond the housing, and a second biasing means coaxially positioned about said reduced portion of said rod and resting on said shoulder of said rod for urging said rod to project beyond the sleeve.

3. In a device for simultaneously measuring the angle and diameter of an angularly tapered countersink in a surface, a housing having a bore therein, a sleeve of predetermined thickness slidably positioned within said bore, a rod of predetermined diameter slidably positioned within said sleeve, angle indicating means responsive to the relative displacement of said sleeve and rod for indicating the angle of the countersink, diameter indicating means responsive to the relative displacement of said sleeve and housing for indicating the diameter of the countersink, and means for urging said sleeve and rod into engagement with the tapered surface of the countersink while maintaining said housing on said surface.

4. In a gaging device for measuring an angle ($\alpha$) and a diameter (D) of a countersink, a housing having a bore therein, a sleeve of predetermined thickness (B) slidably positioned within the bore, a rod of predetermined diameter slidably positioned within the sleeve, means for urging the rod and sleeve into the countersink to displace the rod relative to the sleeve a distance (A) and to displace the sleeve relative to the housing a distance (Z), angle indicating means responsive to the relative displacement of the rod and sleeve in accordance with the relationship $\alpha = \tan^{-1} B/A$, and diameter indicating means responsive to the relative displacement of the sleeve and housing in accordance with the relationship $D = 2X + 2Y$ where $2X$ is the sum of the predetermined thickness of the sleeve and the predetermined diameter of the rod and $2Y$ is $2 \tan \alpha (Z)$.

References Cited in the file of this patent

UNITED STATES PATENTS

| 2,492,369 | Robins | Dec. 27, 1949 |
| 2,622,336 | Raout | Dec. 23, 1952 |
| 2,788,582 | Middeler | Apr. 16, 1957 |
| 2,801,474 | Field et al. | Aug. 6, 1957 |
| 2,975,524 | Field | Mar. 21, 1961 |

FOREIGN PATENTS

| 856,502 | Great Britain | Dec. 21, 1960 |

OTHER REFERENCES

"American Machinist," Feb. 14, 1946, page 130 (article and FIG. 7).